United States Patent
Eom et al.

(10) Patent No.: US 10,823,119 B2
(45) Date of Patent: Nov. 3, 2020

(54) DUAL PURGE SYSTEM FOR VEHICLE

(71) Applicants: Hyundai Motor Company, Seoul (KR); KIA Motors Corporation, Seoul (KR)

(72) Inventors: Tae Kwang Eom, Hwaseong-si (KR); Soo Hong Lee, Seoul (KR); Kyu Sup Kim, Seoul (KR)

(73) Assignees: HYUNDAI MOTORS COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/406,084

(22) Filed: May 8, 2019

(65) Prior Publication Data
US 2020/0182198 A1 Jun. 11, 2020

(30) Foreign Application Priority Data
Dec. 5, 2018 (KR) .................. 10-2018-0155321

(51) Int. Cl.
| F02D 41/00 | (2006.01) |
| F02M 25/08 | (2006.01) |
| B60K 15/035 | (2006.01) |
| B60K 15/03 | (2006.01) |

(52) U.S. Cl.
CPC ... *F02M 25/0836* (2013.01); *B60K 15/03519* (2013.01); *F02D 41/0032* (2013.01); *F02M 25/089* (2013.01); *B60K 2015/03256* (2013.01)

(58) Field of Classification Search
CPC .... B60K 15/03519; B60K 2015/03256; F02D 41/0032; F02M 25/0836; F02M 25/089
See application file for complete search history.

(56) References Cited

U.S. PATENT DOCUMENTS

| 4,856,483 | A | * | 8/1989 | Beavis | F02B 61/045 |
| | | | | | 123/516 |
| 4,951,643 | A | * | 8/1990 | Sato | F02M 25/0836 |
| | | | | | 123/519 |
| 5,056,494 | A | * | 10/1991 | Kayanuma | F02M 25/0872 |
| | | | | | 123/516 |
| 5,377,644 | A | * | 1/1995 | Krohm | F02D 41/0032 |
| | | | | | 123/520 |
| 5,456,237 | A | * | 10/1995 | Yamazaki | F02M 25/0854 |
| | | | | | 123/519 |
| 5,460,136 | A | * | 10/1995 | Yamazaki | F02M 25/0854 |
| | | | | | 123/519 |

(Continued)

FOREIGN PATENT DOCUMENTS

JP          H08135524 A          5/1996

*Primary Examiner* — Carl C Staubach
(74) *Attorney, Agent, or Firm* — Brinks Gilson & Lione

(57) ABSTRACT

The present disclosure relates to a dual purge system for a vehicle, which varies a purging amount depending on a pressure condition of an intake manifold surge tank to realize desired purging efficiency suitable for a vehicle driving range. In the dual purge system, by desorbing fuel evaporation gas from all canisters in a state of engine negative pressure, a purging amount increases thereby improving fuel efficiency, and by desorbing the fuel evaporation gas from some canisters in a state of engine positive pressure, flow resistance of the gas is reduced in comparison with previous flow resistance thereby increasing desorption efficiency.

6 Claims, 5 Drawing Sheets

(56) References Cited

U.S. PATENT DOCUMENTS

| | | | | |
|---|---|---|---|---|
| 7,008,470 B2 * | 3/2006 | Makino | ............... | B01D 53/02 |
| | | | | 123/519 |
| 7,614,387 B2 * | 11/2009 | Wang | ............... | B60K 15/03519 |
| | | | | 123/519 |
| 2011/0240896 A1 * | 10/2011 | Young | ............... | F02M 25/089 |
| | | | | 251/129.15 |
| 2013/0220282 A1 * | 8/2013 | Hadre | ............... | F02M 25/089 |
| | | | | 123/520 |
| 2015/0096541 A1 * | 4/2015 | Edmund | ............... | F02M 35/10222 |
| | | | | 123/520 |
| 2015/0292421 A1 | 10/2015 | Pursifull et al. | | |
| 2016/0341155 A1 * | 11/2016 | Dudar | ............... | F02B 37/164 |
| 2020/0141362 A1 * | 5/2020 | Eom | ............... | F02D 41/0032 |

* cited by examiner

DUAL PURGE SYSTEM FOR VEHICLE

CROSS REFERENCE TO RELATED APPLICATION

This application claims priority to and the benefit of Korean Patent Application No. 10-2018-0155321, filed on Dec. 5, 2018, which is incorporated herein by reference in its entirety.

FIELD

The present disclosure relates generally to a dual purge system for a vehicle.

BACKGROUND

The statements in this section merely provide background information related to the present disclosure and may not constitute prior art.

Generally, fuel evaporation gas (i.e., oil vapor) is generated when fuel in a fuel tank is evaporated by external heat or while refueling.

For this fuel evaporation gas, a method for collecting in a canister is adopted, and in this method, the fuel evaporation gas collected in the canister is mixed with air in an intake manifold through a purge system and then combusts in a combustion chamber.

Especially, a multi-point injection engine (MPI engine) is used as a countermeasure for environmental regulations related to the fuel evaporation gas through a single purge system.

However, in a turbo gasoline direct injection (GDI) engine, we have discovered that the single purge system cannot be used because positive pressure is generated in an intake manifold during operation of the turbo GDI engine.

That is, with operating a turbo charger, compressed air flows into the intake manifold, and the positive pressure is generated in the intake manifold, thus we have discovered that it is impossible to perform a desired purging function by using a conventional single purge system.

Recently, there is attempt to apply a dual purge system to the turbo GDI engine for satisfying regulations and merchantability.

That is, by providing a device for generating negative pressure during the operation of the turbo charger, fuel evaporation gas discharged from a canister may be purged in a surge tank when an engine is in a state of negative pressure, and fuel evaporation gas may flow into a combustion chamber by negative pressure generated by a negative pressure generating device when the turbo charger is operated.

However, in the case of the conventional dual purging system, we have found that since one canister is used thereon, fuel evaporation gas is desorbed by absorbing the entire canister regardless of purging efficiency. Therefore, when negative pressure is generated to purge depending on the operation of the turbo charger, flow resistance of the fuel evaporation gas becomes large and a large load is applied, so that desorption efficiency decreases.

The above information disclosed in this Background section is only for enhancement of understanding of the background of the present disclosure, and therefore it may contain information that does not form the prior art that is already known to a person of ordinary skill in the art.

SUMMARY

The present disclosure provides a dual purge system for a vehicle, which varies a purging amount depending on a pressure condition of an intake manifold surge tank to realize desired purging efficiency suitable for a vehicle driving range.

According to one aspect of the present disclosure, the dual purge system includes a plurality of canisters configured for collecting fuel evaporation gas of a fuel tank, a desorbing control device configured for desorbing, by negative pressure, the fuel evaporation gas collected in the canister, and a valve provided at a position at which fuel evaporation gases separately discharged from each of the canisters converge into one stream, and allowing the converging fuel evaporation gas to flow in a direction toward a purge control solenoid valve (PCSV).

According to a further aspect of the present disclosure, the desorbing control device may include a one-way valve which may be provided between the canisters, opened when a predetermined absorption force or more acts thereon, and configured such that the fuel evaporation gas collected in the canisters flows only in a direction from any one of the canisters to another canister.

The valve may be configured such that the converged fuel evaporation gas flows only in the direction toward the PCSV.

According to a further aspect of the present disclosure, the canisters may include a first canister and a second canister and the first canister has a collecting capacity of fuel evaporation gas larger than a capacity of the second canister. In addition, the one-way valve may be provided between the first canister and the second canister such that the fuel evaporation gas may flow only in a direction from the second canister to the first canister.

According to a further aspect of the present disclosure, a first partition and a second partition may be provided respectively in the first canister and the second canister to divide inside spaces of the first canister and the second canister into parts, respectively. Activated carbon may be provided inside the first canister and the second canister such that low efficiency activated carbon and high efficiency activated carbon having different passing efficiencies of fuel evaporation gas may be separately arranged based on each of the first partition and the second partition, and the one-way valve may be provided between a part of the inside space of the first canister with the high efficiency activated carbon and a part of the inside space of the second canister with the high efficiency activated carbon.

According to a further aspect of the present disclosure, a first canister close valve and a second canister close valve may be provided respectively in the parts of the inside spaces of the first canister and the second canister each including the low efficiency activated carbon therein.

According to one aspect of the present disclosure, the desorbing control device may be configured such that discharging lines having different inner diameters are connected between the canisters and the valve.

The dual purge system may further include an engine negative pressure purge line connected between the PCSV and a front end of a surge tank, an ejector provided on a front end of a turbo charger and generating negative pressure, and an engine positive pressure purge line connected between the PCSV and the ejector.

According to one aspect of the present disclosure, the valve may be a two-way valve.

As described above, when the engine is in a range of negative pressure, fuel evaporation gas collected in all canisters is desorbed and absorbed by absorption force due to engine negative pressure, and a purging amount increases, thereby improving fuel efficiency. However, when the engine is in a range of positive pressure, the fuel evaporation gas is desorbed only in a canister with a small size to reduce flow resistance of the fuel evaporation gas, thereby improving desorption efficiency of the fuel evaporation gas. Accordingly, the dual purge system of the present disclosure can realize desired purging efficiency suitable for a vehicle driving range.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will not be described various forms thereof, given by way of example, reference being made to the accompanying drawings in which.

Figure 1:
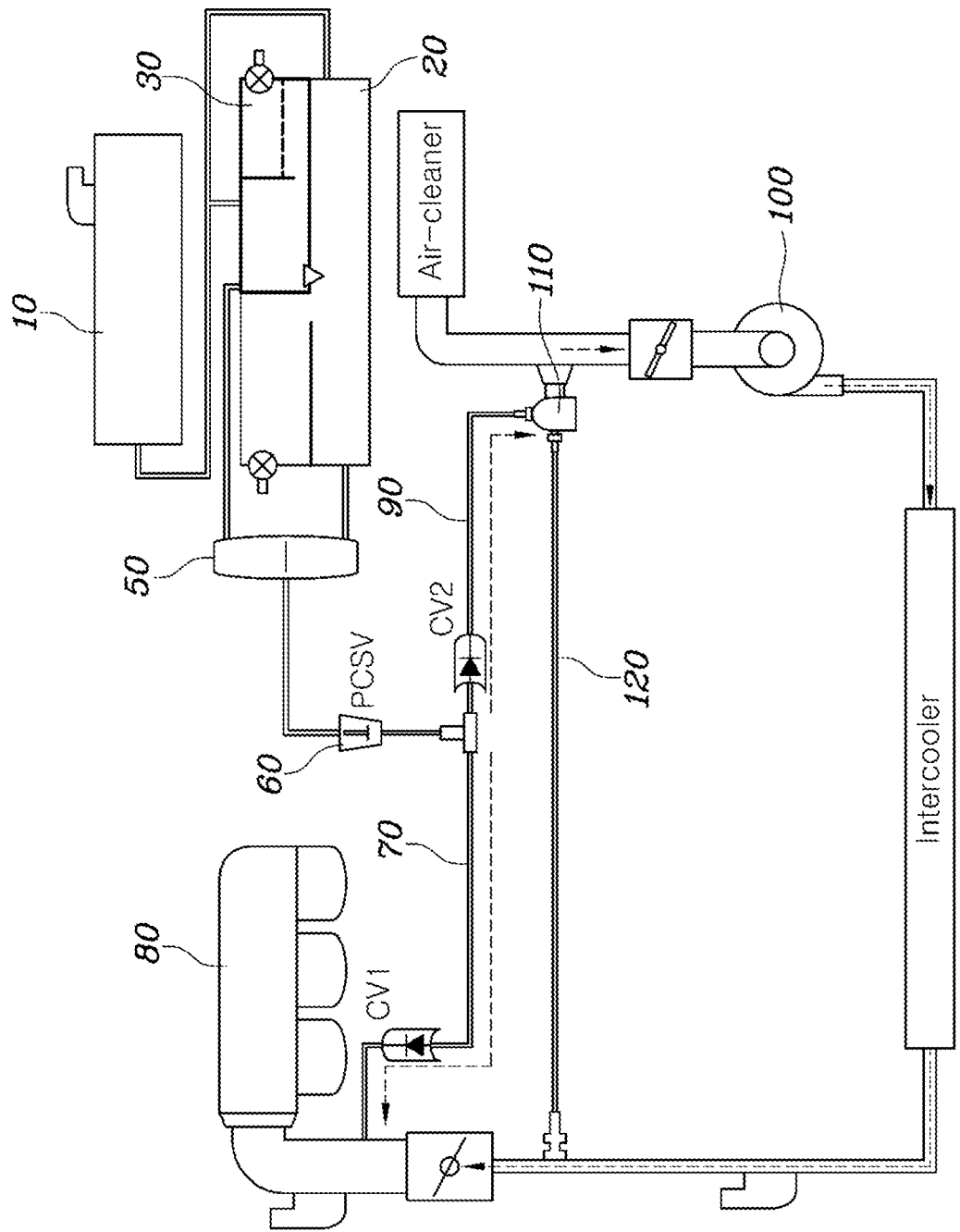
FIG. 1 is a block diagram showing a dual purge system for a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

According to an exemplary form of the present disclosure, a dual purge system for a vehicle includes a plurality of canisters, a desorbing control device, and a valve 50 (more specifically, a two-way valve).

Figure 2:
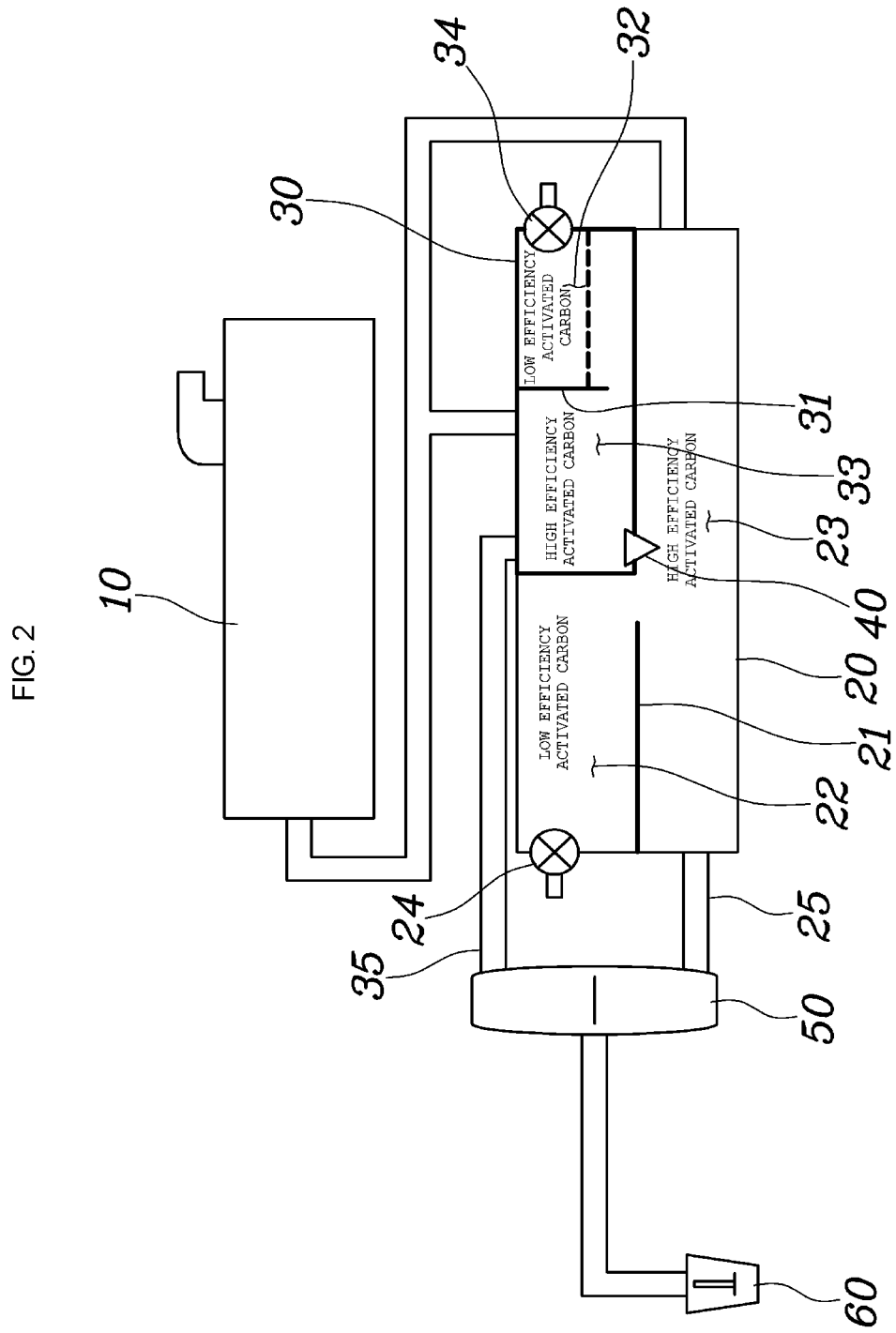
FIG. 2 is a schematic view for a combination of a plurality of canisters in the system according to the exemplary form of the present disclosure.

Referring to FIGS. 1 and 2, the plurality of canisters is provided to collect fuel evaporation gas of a fuel tank 10, and the desorbing control device is provided such that the fuel evaporation gas collected in the canisters is desorbed from the canisters by negative pressure.

The two-way valve 50 is provided at a position at which fuel evaporation gases separately discharged from each of the canisters converge into one stream, and allows the converging fuel evaporation gas to flow only in a direction toward a purge control solenoid valve (PCSV) 60.

Here, the two-way valve 50 is provided such that the fuel evaporation gas flows only in the direction toward the PCSV 60.

As an example of the desorbing control device, a one-way valve 40 may be used.

For example, the one-way valve 40 is provided between the canisters and opened when predetermined absorption force or more acts thereon. Since the predetermined absorption force corresponds to engine negative pressure, fuel evaporation gas collected in the canisters flows only in a direction from any one of the canisters to another canister while the one-way valve 40 is opened.

That is, in a range of part load such as a range of engine negative pressure, when the one-way valve 40 is opened by absorption force due to the engine negative pressure, the fuel evaporation gas collected in all canisters is desorbed and absorbed, and a purging amount increases thereby improving fuel efficiency.

As shown in FIG. 1, however, when the engine is in a state of positive pressure due to boosting of a turbo charger 100, a driving condition is mostly in a range of full load. In this case, the one-way valve 40 is closed because the absorption force is relatively low depending on the engine positive pressure, and only fuel evaporation gas that is collected in some canisters is desorbed and absorbed.

That is, in a range of the engine positive pressure, since fuel amount is fundamentally large, a purging amount contributing to improvement of engine performance is small and purging efficiency is also lower than the range of engine negative pressure, so that purging capacity of the canister is reduced. Therefore, when the engine is in the state of engine positive pressure, the fuel evaporation gas is desorbed and absorbed only in some canisters to reduce flow resistance, thereby increasing desorption efficiency of the fuel evaporation gas.

As shown in FIG. 2, the dual purge system of the present disclosure may be configured by combining two canisters that are a first canister 20 and a second canister 30.

Especially, the first canister 20 is formed to be larger than the second canister 30 and has a large capacity of collecting fuel evaporation gas. Therefore, the one-way valve 40 is provided between the first canister 20 and the second canister 30 and is configured such that fuel evaporation gas flows only in a direction from the second canister 30 to the first canister 20.

Figure 3:
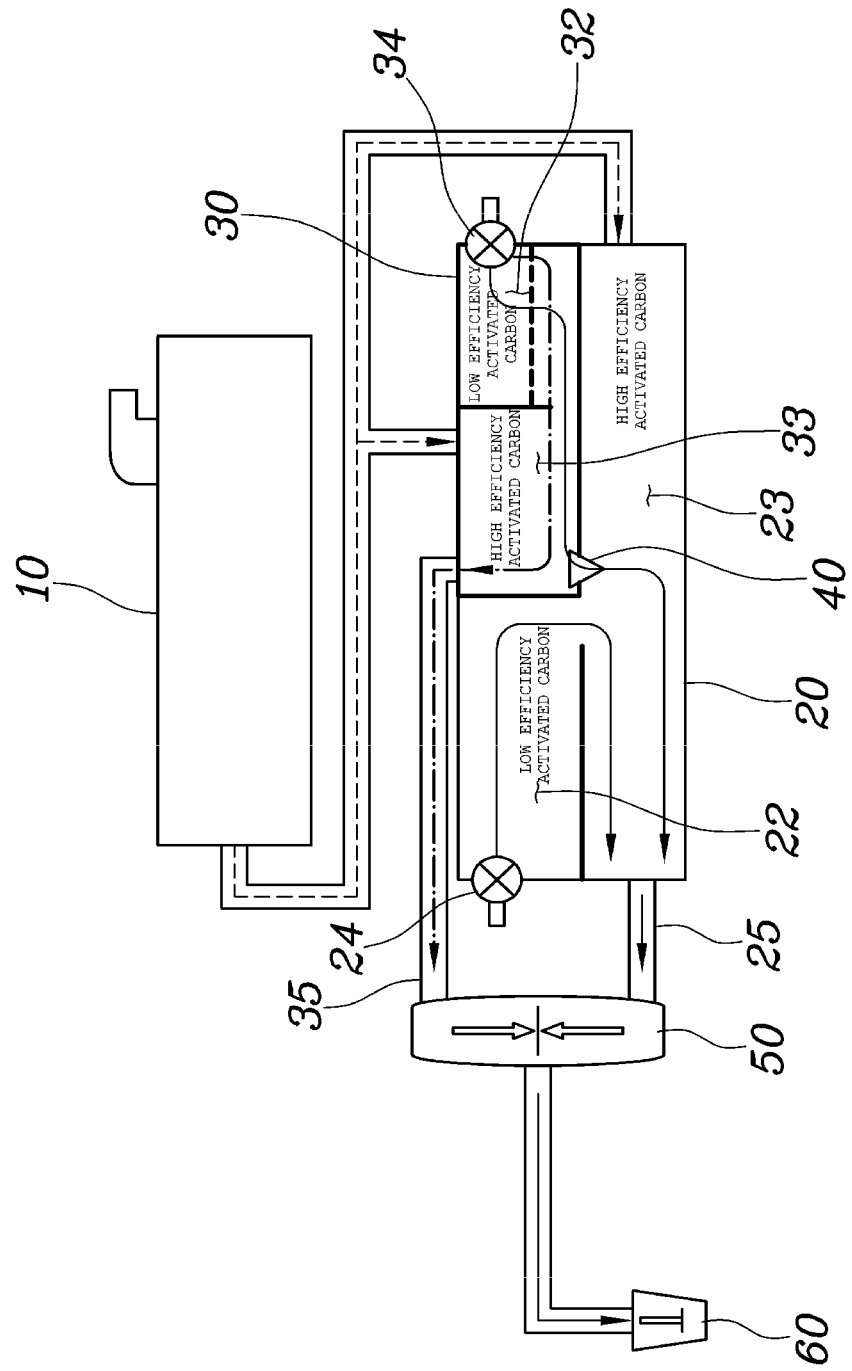
FIG. 3 is a schematic view for flow of fuel evaporation gas according to the exemplary form of the present disclosure when an engine is in a state of negative pressure.

That is, when the engine is in the state of negative pressure, since the one-way valve 40 is opened by absorption force due to the engine negative pressure as shown in FIG. 3, fuel evaporation gas collected in the second canister 30 flows into the first canister 20 through the one-way valve 40. Accordingly, fuel evaporation gases collected in the first canister 20 and the second canister 30 are purged, thereby increasing the purging amount.

Figure 4:
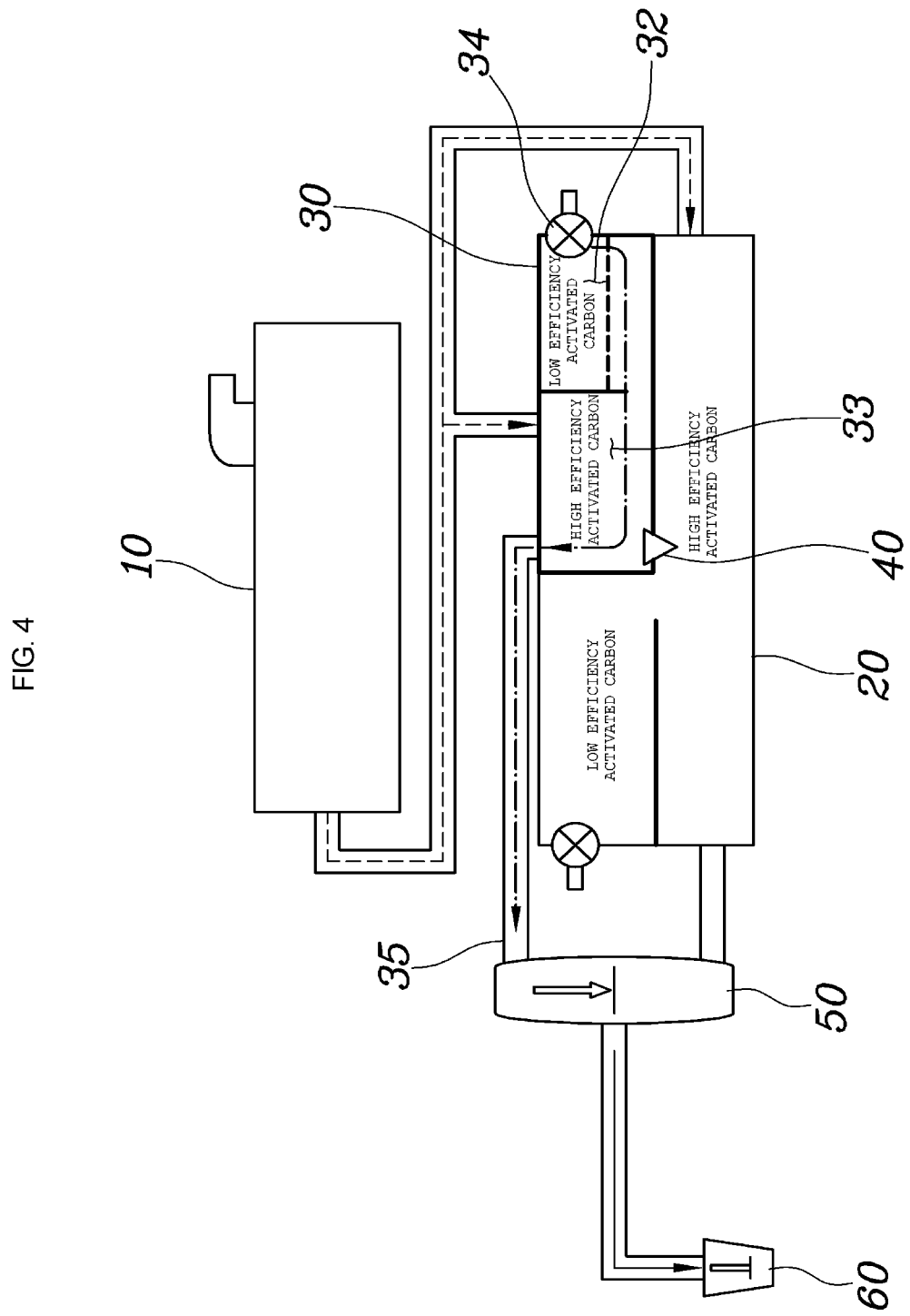
FIG. 4 is a schematic view for flow of fuel evaporation gas according to the exemplary form of the present disclosure when the engine is in a state of positive pressure.
Figure 5:
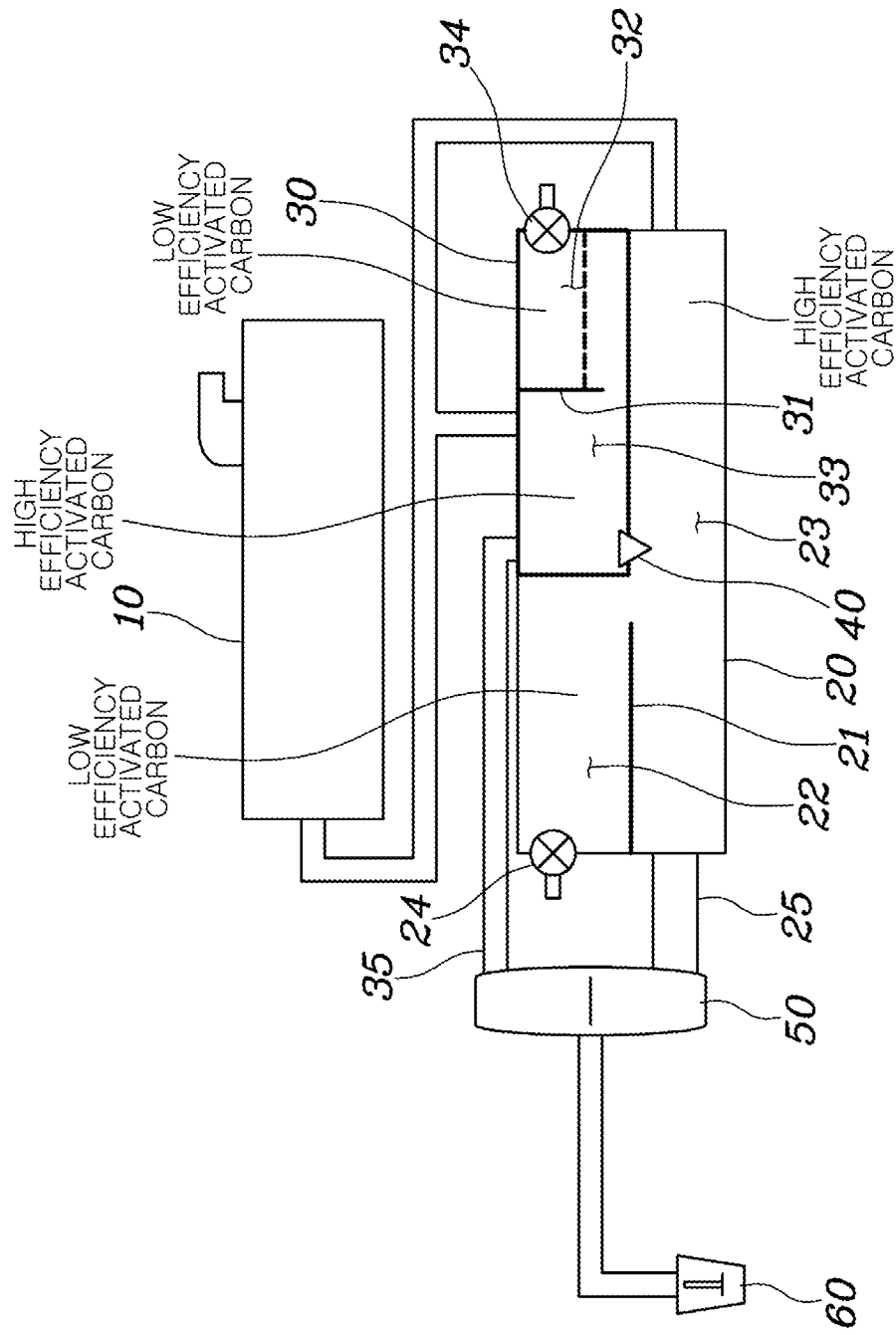
FIG. 5 is a schematic view for a combination of a plurality of canisters in the system according to the exemplary form of the present disclosure, wherein discharging lines having different inner diameters.

Whereas, when the engine is in the state of positive pressure, since the one-way valve 40 remains in a closed state depending on the engine positive pressure as shown in FIG. 4, the fuel evaporation gas of the first canister 20 with large collecting capacity is not absorbed, but the fuel evaporation gas of the second canister 30 with relative small collecting capacity is only purged. Therefore, flow resistance of the fuel evaporation gas is reduced thereby increasing desorption efficiency of the fuel evaporation gas.

Referring back to FIG. 2, a first partition 21 is provided to divide an inside space of the first canister 20 into parts, and a second partition 31 is provided to divide an inside space of the second canister 30 into parts.

For example, activated carbon is provided in the inside spaces of the first canister 20 and the second canister 30 such that low efficiency activated carbon 22 and 32 and high efficiency activated carbon 23 and 33 are separately arranged on the basis of each of the first partition 21 and the second partition 31, wherein the high and low efficiency activated carbon have different efficiencies for passing fuel evaporation gas.

As shown in FIG. 2, the one-way valve 40 is provided between a part of the inside space of the first canister 20 with the high efficiency activated carbon 33 and a part of the inside space of the second canister 30 with the high efficiency activated carbon 33.

In addition, a first canister close valve 24 is provided at an end of the first canister 20 that is the part with the low efficiency activated carbon 22, and a second canister close valve 34 is provided at an end of the second canister 30 that is the part with the low efficiency activated carbon 32. That is, the low efficiency activated carbon 32 that has a small intake and discharge amount of fuel evaporation gas is arranged near the atmosphere.

When the engine is in the state of positive pressure, outside air flows into the second canister 30 through the second canister close valve 34 as shown in FIG. 4, and flows while passing through the low efficiency activated carbon 32 and the high efficiency activated carbon 33, sequentially. However, when the one-way valve 40 is closed, the fuel evaporation gas does not flow toward the first canister 20, but flows toward the two-way valve 50 through a second discharging line 35 connected between the second canister 30 and the two-way valve 50.

However, when the engine is in the state of negative pressure, outside air flows into the second canister 30 through the second canister close valve 34 by strong absorption force due to the engine negative pressure as shown in FIG. 3, and also outside air flows into the first canister 20 through the first canister close valve 24, and flows while sequentially passing through the low efficiency activated carbon 22 and 32 and the high efficiency activated carbon 23 and 33.

Accordingly, fuel evaporation gas in the second canister 30 flows into the two-way valve 50 through the second discharging line 35, and the fuel evaporation gas in the first canister 20 flows into the two-way valve 50 through a first discharging line 25 connected between the first canister 20 and the two-way valve 50. Particularly, in this case, by opening the one-way valve 40 by the engine negative pressure, the fuel evaporation gas desorbed from the second canister 30 flows also into the first canister 20, so that it flows into the two-way valve 50 with fuel evaporation gas desorbed from the first canister 20.

Subsequently, as another example of the desorbing control device, a differentiated structure of the discharging line connected between the canisters and the two-way valve 50 may be implemented.

As shown in FIGS. 2 and 3, the first discharging line 25 is connected between the first canister 20 and the two-way valve 50, and the second discharging line 35 is connected between the second canister 30 and the two-way valve 50.

In addition, inner diameters of first discharging line 25 and the second discharging line 35 are formed differently.

That is, even when collecting capacities of the first canister 20 and the second canister 30 are equal to each other, by forming inner diameters of the discharging lines differently, during positive pressure with relatedly small absorption force, the fuel evaporation gas may be desorbed only in a canister connected to a discharging line having a small diameter. In addition, during negative pressure with relatively large absorption force, the fuel evaporation gas may be desorbed in a canister connected to a discharging line with large inner diameter as well as the canister connected to the discharging line with the small inner diameter.

Meanwhile, the plurality of canisters according to the present disclosure may be applied to the dual purge system. Referring back to FIG. 1, the dual purge system is configured such that an engine negative pressure purge line 70 is connected between the PCSV 60 and a surge tank 80.

An ejector 110 is provided on a front end of a turbo charger 100 and generates negative pressure, and a recirculation flow line 120 may be connected between the ejector 110 and a front end of a throttle valve.

In addition, an engine positive pressure purge line 90 is connected between the PCSV 60 and the ejector 110. A check valve is provided on each of the engine positive pressure purge line 90 and the engine negative pressure purge line 70 to inhibit backflow of fuel evaporation gas.

That is, when the engine is in the state of positive pressure, by negative pressure generated depending on operation of the turbo charger 100, fuel evaporation gas is desorbed in the second canister 30 with small collecting capacity and flows into the PCSV 60. Then, when the PCSV 60 is operated by receiving a signal of a controller, the fuel evaporation gas flows along the engine positive pressure purge line 90 into a combustion chamber through the front end of the turbo charger, so that the fuel evaporation gas may be purged.

However, when the engine is in the state of negative pressure, fuel evaporation gas is desorbed in both the first canister 20 and the second canister 30 by strong absorption force to flow into the PCSV 60, and when the PCSV 60 is operated by receiving a signal of the controller, the fuel evaporation gas flows along the engine negative pressure purge line 70 into the surge tank 80, so that the fuel evaporation gas may be purged.

According to the present disclosure, in the range of engine negative pressure, fuel evaporation gas collected in the first canister 20 and the second canister 30 is desorbed and absorbed by the absorption force due to the engine negative pressure, so that the purging amount increases, thereby improving the fuel efficiency.

However, in the range of engine positive pressure, fuel evaporation gas is desorbed only in the second canister 30 having a small size to reduce flow resistance of the fuel evaporation gas, thereby increasing desorption efficiency of fuel evaporation gas.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A dual purge system for a vehicle having a fuel tank, the dual purge system comprising:
   a plurality of canisters configured for collecting fuel evaporation gas of the fuel tank;
   a desorbing control device configured for desorbing, by negative pressure, the fuel evaporation gas collected in the canister; and
   a valve provided at a position at which fuel evaporation gases separately discharged from each of the canisters converge into one stream, the valve allowing converged fuel evaporation gas to flow in a direction toward a purge control solenoid valve (PCSV),
   wherein:
   the desorbing control device comprises a one-way valve which is provided between the canisters, opened when a predetermined absorption force or more acts thereon, and configured such that the fuel evaporation gas collected in the canisters flows only in a direction from any one of the canisters to another canister, the canisters include a first canister and a second canister and the first canister has a collecting capacity of fuel evaporation gas larger than a capacity of the second canister, the one-way valve is provided between the first canister and the second canister such that the fuel evaporation gas flows only in a direction from the second canister to the first canister, a first partition and a second partition are provided respectively in the first canister and the second canister to divide inside spaces of the first canister and the second canister into parts, respectively, activated carbon is provided inside the first canister and the second canister such that low efficiency activated carbon and high efficiency activated carbon having different passing efficiencies of fuel evaporation gas are separately arranged based on each of the first partition and the second partition, and the one-way valve is provided between a part of the inside space of the first canister with the high efficiency activated carbon and a part of the inside space of the second canister with the high efficiency activated carbon.

2. The dual purge system of claim 1, wherein the valve is configured such that the converged fuel evaporation gas flows only in the direction toward the PCSV.

3. The dual purge system of claim 1, wherein a first canister close valve and a second canister close valve are respectively provided in the parts of the inside spaces of the first canister and the second canister each including the low efficiency activated carbon therein.

4. The dual purge system of claim 1, wherein the desorbing control device is configured such that discharging lines having different inner diameters are connected between the canisters and the valve.

5. The dual purge system of claim 1, further comprising:
an engine negative pressure purge line connected between the PCSV and a front end of a surge tank;
an ejector provided on a front end of a turbo charger and generating negative pressure; and
an engine positive pressure purge line connected between the PCSV and the ejector.

6. The dual purge system of claim 1, wherein the valve is a two-way valve.

* * * * *